(12) United States Patent
Shin et al.

(10) Patent No.: US 11,070,970 B2
(45) Date of Patent: Jul. 20, 2021

(54) APPARATUS AND METHOD FOR PROVIDING UNIVERSAL PLUG AND PLAY SERVICE BASED ON WI-FI DIRECT CONNECTION IN PORTABLE TERMINAL

(71) Applicant: Samsung Electronics Co., Ltd., Suwon-si (KR)

(72) Inventors: Ho-Chul Shin, Yongin-si (KR); Se-Hee Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/833,337

(22) Filed: Dec. 6, 2017

(65) Prior Publication Data
US 2018/0098214 A1    Apr. 5, 2018

Related U.S. Application Data

(63) Continuation of application No. 14/000,515, filed as application No. PCT/KR2012/001164 on Feb. 16, 2012, now Pat. No. 9,883,376.

(30) Foreign Application Priority Data

Feb. 21, 2011    (KR) ........................ 10-2011-0014973

(51) Int. Cl.
*H04W 8/24* (2009.01)
*H04W 76/23* (2018.01)
(Continued)

(52) U.S. Cl.
CPC ............. *H04W 8/24* (2013.01); *H04W 76/23* (2018.02); *H04L 41/0809* (2013.01);
(Continued)

(58) Field of Classification Search
CPC ..... H04W 8/24; H04W 76/043; H04W 76/23; H04W 84/12; H04W 48/14; H04W 48/16; H04L 41/0809
See application file for complete search history.

(56) References Cited

U.S. PATENT DOCUMENTS 8,792,429 B2 * 7/2014 Hassan ............... H04L 12/2818
370/329
2002/0184311 A1   12/2002 Traversat et al.
(Continued)

FOREIGN PATENT DOCUMENTS

WO    2011/062404 A2    5/2011

OTHER PUBLICATIONS

Wi-Fi Certified Wi-Fi Direct, Personal, portable Wi-Fi technology, Wi-Fi Alliance, Oct. 2010.

*Primary Examiner* — Patrice L Winder
*Assistant Examiner* — Aye M Aung
(74) *Attorney, Agent, or Firm* — Jefferson IP Law, LLP

(57) ABSTRACT

An apparatus and method for improving performance of a service based on Wi-Fi direct connection by verifying URI information for controlling a P2P client in a device discovery process of a MAC layer when providing a UPnP service function based on the Wi-Fi direct connection is provided. The apparatus includes a message sending unit for sending a device discovery request, a message receiving unit for receiving a response message, including URI information of a P2P client, for the device discovery request, a message analyzing unit for acquiring the URI information included in the response message, and a service controller for performing a UPnP service function based on the Wi-Fi direct connection using the acquired URI information when connecting with the P2P client, wherein the device discovery request is a device discovery request of a Wi-Fi MAC layer.

12 Claims, 7 Drawing Sheets

(51) Int. Cl.
  *H04W 48/14*   (2009.01)
  *H04W 48/16*   (2009.01)
  *H04W 84/12*   (2009.01)
  *H04L 12/24*   (2006.01)

(52) U.S. Cl.
  CPC ............ *H04W 48/14* (2013.01); *H04W 48/16* (2013.01); *H04W 84/12* (2013.01)

(56) References Cited

U.S. PATENT DOCUMENTS

| | | |
|---|---|---|
| 2005/0004995 A1 | 1/2005 | Stochosky |
| 2005/0097610 A1 | 5/2005 | Pedlow, Jr. et al. |
| 2005/0188193 A1 | 8/2005 | Kuehnel et al. |
| 2006/0072569 A1 | 4/2006 | Eppinger et al. |
| 2007/0234385 A1 | 10/2007 | Bopardikar et al. |
| 2007/0286100 A1* | 12/2007 | Saaranen ................ H04L 67/16 370/260 |
| 2008/0133538 A1 | 6/2008 | Chavez et al. |
| 2008/0137663 A1 | 6/2008 | Gu et al. |
| 2008/0304408 A1* | 12/2008 | Kraemer ................ H04L 67/16 370/230 |
| 2009/0017844 A1* | 1/2009 | Li ........................ H04W 68/00 455/458 |
| 2009/0316672 A1 | 12/2009 | Balasubramanian et al. |
| 2009/0319502 A1 | 12/2009 | Chalouhi et al. |
| 2010/0260101 A1* | 10/2010 | Tsirtsis ................ H04W 76/14 370/328 |
| 2010/0322213 A1* | 12/2010 | Liu ........................ H04L 67/16 370/338 |
| 2011/0010246 A1 | 1/2011 | Kasslin et al. |
| 2011/0082939 A1* | 4/2011 | Montemurro ........... H04L 69/24 709/227 |
| 2011/0082940 A1 | 4/2011 | Montemurro et al. |
| 2011/0145397 A1* | 6/2011 | Burns ................... H04L 61/256 709/224 |
| 2011/0188391 A1 | 8/2011 | Sella et al. |
| 2011/0207408 A1* | 8/2011 | Lefebvre ............... H04L 67/104 455/41.2 |
| 2011/0216753 A1* | 9/2011 | Kneckt ................... H04L 45/70 370/338 |
| 2012/0099566 A1 | 4/2012 | Laine et al. |
| 2012/0131101 A1* | 5/2012 | Said ........................ G06F 9/5072 709/204 |
| 2012/0147825 A1 | 6/2012 | Hassan et al. |
| 2012/0157121 A1* | 6/2012 | Li .......................... G01S 5/0018 455/456.2 |
| 2012/0180098 A1* | 7/2012 | Kim ................. H04N 21/64322 725/110 |
| 2012/0208462 A1 | 8/2012 | Lee et al. |
| 2012/0320893 A1* | 12/2012 | Jamadagni ......... H04L 12/2818 370/338 |

\* cited by examiner

| ANQP QUERY RESPONSE FOR UPnP Internet Gateway Device | | | | |
|---|---|---|---|---|
| QUI Subtype | Service Update Indicator | Length | Service Protocol type | Service Transaction ID | Query Data |
| 0X09 | 1 | Length | 2 | 1 | 0X10uuid:6859:6859dede-123456::urn:schemas-upnp-org:device:InternetGatewayDevice:1 ::LOCATION:8080/smp/device.xml 701 |

FIG. 7A

| ANQP Query Response for UPnP Internet Gateway Device | | | | |
|---|---|---|---|---|
| QUI Subtype | Service Update Indicator | Length | Service Protocol type | Service Transaction ID | Query Data |
| 0X09 | 1 | Length | 2 | 1 | 0X10uuid:6859:6859dede-123456::urn:schemas-upnp-org:device:InternetGatewayDevice:1 ::LOCATION:/smp/device.xml 703 |

FIG. 7B

| ANQP Query Response for UPnP Internet Gateway Device | | | | |
|---|---|---|---|---|
| QUI Subtype | Service Update Indicator | Length | Service Protocol type | Service Transaction ID | Query Data |
| 0X09 | 1 | Length | 2 | 1 | 0X10uuid:6859:6859dede-123456::urn:schemas-upnp-org:device:InternetGatewayDevice:1 ::LOCATION:http://192.168.0.10:8080/smp/device.xml 705 |

FIG. 7C

APPARATUS AND METHOD FOR PROVIDING UNIVERSAL PLUG AND PLAY SERVICE BASED ON WI-FI DIRECT CONNECTION IN PORTABLE TERMINAL

CROSS REFERENCE TO RELATED APPLICATION(S)

This application is a continuation application of prior application Ser. No. 14/000,515, filed on Sep. 10, 2013, which is a U.S. National Stage application under 35 U.S.C. § 371 of an International application filed on Feb. 16, 2012 and assigned application number PCT/KR2012/01164, and claimed the benefit under 35 U.S.C. § 119(a) of a Korean patent application filed on Feb. 21, 2011 in the Korean Intellectual Property Office and assigned Serial number 10-2011-0014973, the entire disclosure of which is hereby incorporated by reference.

TECHNICAL FIELD

The present invention relates to a Wi-Fi function of a portable terminal. More particularly, the present invention relates to an apparatus and method for improving performance of a service based on Wi-Fi direct connection by verifying Uniform Resource Identifier (URI) information for controlling a Peer-to-Peer (P2P) client in a device discovery process of a Media Access Control (MAC) layer when providing a Universal Plug and Play (UPnP) service function based on the Wi-Fi direct connection.

BACKGROUND

Portable terminals capable of servicing wireless voice calls and exchanging information have become the necessities of life according to those rapid development. Portable terminals have been recognized that it is possible to be simply carried and service wireless voice calls at the beginning of those propagation. However, usage ranges of portable terminals, such as a remote controller function using local-area communication, an image capturing function using a mounted digital camera, and a wireless Local Area Network (LAN) function as well as a telephone call function, a scheduling management function, etc. according to development of those technology and introduction of the wireless Internet, have become more and more increased to satisfy desires of users.

The wireless LAN function services communication such as the Internet to the portable terminal (e.g., a Personal Digital Assistant (PDA), a notebook, etc.) which is positioned within certain distance centered on a place where an Access Point (AP) which is a radio access device is installed. An arrival distance of radio waves of a wireless LAN was only 10 meters at the beginning of its introduction. However, the arrival distance of radio waves of the wireless LAN has been expanded to 50 meters to several-hundred meters after the 2000s and a transfer rate of the wireless LAN has also been improved to transmit and receive high-volume multimedia data.

Recently, Wi-Fi technology capable of freely performing communication between Wi-Fi devices without an AP or a router and sharing a printer, contents, etc. was developed. The Wi-Fi technology is referred to as Wi-Fi P2P. A P2P group owner and a P2P client may be composed by the Wi-Fi technology.

FIG. 1 is a flowchart illustrating a process of providing a UPnP service function based on Wi-Fi direct connection in a general portable terminal.

Referring to FIG. 1, assuming that the portable terminal reproduces previously stored multimedia data on a peripheral TV using a UPnP service based on Wi-Fi direct connection, a description will be given.

First of all, the portable terminal for performing the aforementioned operation operates a wireless LAN module in step 101. The portable terminal proceeds to step 103 and performs a device discovery process. Herein, the device discovery process is a device discovery process of a Wi-Fi MAC layer. The portable terminal sends a discovery request signal to discover a TV which exists around it and receives response signals from peripheral terminals including the TV. The portable terminal generates a list for the terminals which exist around it using the received response signals.

The portable terminal which performs the aforementioned device discovery process proceeds to step 105 and performs a device selection process of selecting the TV included on the list. The portable terminal proceeds to step 107 and assigns an Internet Protocol (IP) for communicating with the TV.

The portable terminal proceeds to step 109 and performs a UPnP discovery process for discovering devices of an application layer. Herein, the portable terminal discovers a terminal which enters a network and verifies a URI address capable of controlling the terminal.

The portable terminal proceeds to step 111, performs a UPnP description process using the URI address verified in step 109, and verifies service contents of the terminal.

The portable terminal proceeds to step 113 and performs a UPnP service function based on Wi-Fi direct connection by reproducing the previously stored multimedia data.

The portable terminal ascertains whether a terminal exists through the device discovery process of the Wi-Fi MAC layer. However, the portable terminal performs the device discovery process of the application layer again in step 109. Therefore, there is a problem in that time up to a service provision ready state is delayed.

Accordingly, in order to solve the aforementioned problem, an apparatus and method for reducing a device discovery process which is repeatedly performed is needed.

SUMMARY

An exemplary aspect of the present invention is to solve at least the above-mentioned problems and/or disadvantages and to provide at least the advantages described below. Accordingly, an aspect of the present invention is to provide an apparatus and method for improving performance of a service based on Wi-Fi direct connection in a portable terminal.

Another aspect of the present invention is to provide an apparatus and method for verifying URI information capable of controlling a terminal in a device discovery process of a Wi-Fi MAC layer in a portable terminal.

Another aspect of the present invention is to provide an apparatus and method for generating a response signal including URI information in a P2P client which receives a service discovery request in a Wi-Fi MAC layer.

Another aspect of the present invention is to provide an apparatus and method for omitting a UPnP discovery process which is a device discovery process of an application layer and improving a Wi-Fi direct function in a portable terminal.

In accordance with an aspect of the present invention, an apparatus for providing a UPnP service based on Wi-Fi direct connection in a P2P group owner is provided. The apparatus includes a message sending unit for sending a device discovery request, a message receiving unit for receiving a response message, including URI information of a P2P client, for the device discovery request, a message analyzing unit for acquiring the URI information included in the response message, and a service controller for performing a UPnP service function based on the Wi-Fi direct connection using the acquired URI information when connecting with the P2P client, wherein the device discovery request is a device discovery request of a Wi-Fi MAC layer.

In accordance with another aspect of the present invention, an apparatus for providing a UPnP service based on Wi-Fi direct connection in a P2P client is provided. The apparatus includes a message receiving unit for receiving a device discovery request, a URI verifying unit for verifying information capable of controlling the P2P client when receiving the device discovery request, a message generating unit for including the verified information in a response message for the device discovery request, and a message sending unit for sending the response message to a P2P group owner, wherein the device discovery request is a device discovery request of a Wi-Fi MAC layer.

In accordance with another aspect of the present invention, a method of providing a UPnP service based on Wi-Fi direct connection in a P2P group owner is provided. The method includes sending a device discovery request, receiving a response message, including URI information of a P2P client, for the device discovery request, acquiring the URI information included in the response message, and performing a UPnP service function based on the Wi-Fi direct connection using the acquired URI information when connecting with the P2P client, wherein the device discovery request is a device discovery request of a Wi-Fi MAC layer.

In accordance with another aspect of the present invention, a method of providing a UPnP service based on Wi-Fi direct connection in a P2P client is provided. The method includes verifying information capable of controlling the P2P client when receiving a device discovery request, including the verified information in a response message for the device discovery request, and sending the response message to a P2P group owner, wherein the device discovery request is a device discovery request of a Wi-Fi MAC layer.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIG. 7A illustrates a structure of a device discovery request response message including specific port information of a P2P client according to one embodiment of the present invention;

FIG. 7B illustrates a structure of a device discovery request response message including specific port information of a P2P client according to one embodiment of the present invention; and FIG. 7C illustrates a structure of a device discovery request response message including an IP address of a P2P client according to one embodiment of the present invention.

DETAILED DESCRIPTION

Exemplary embodiments of the present invention will be described herein below with reference to the accompanying drawings. In the following description, well-known functions or constructions are not described in detail since they would obscure the invention in unnecessary detail.

Hereinafter, a description will be given with respect to an apparatus and method for generating a response signal including URI information in a P2P client which receives a device discovery request to omit a UPnP discovery process which is a device discovery process of an application layer according to the present invention.

Figure 1:
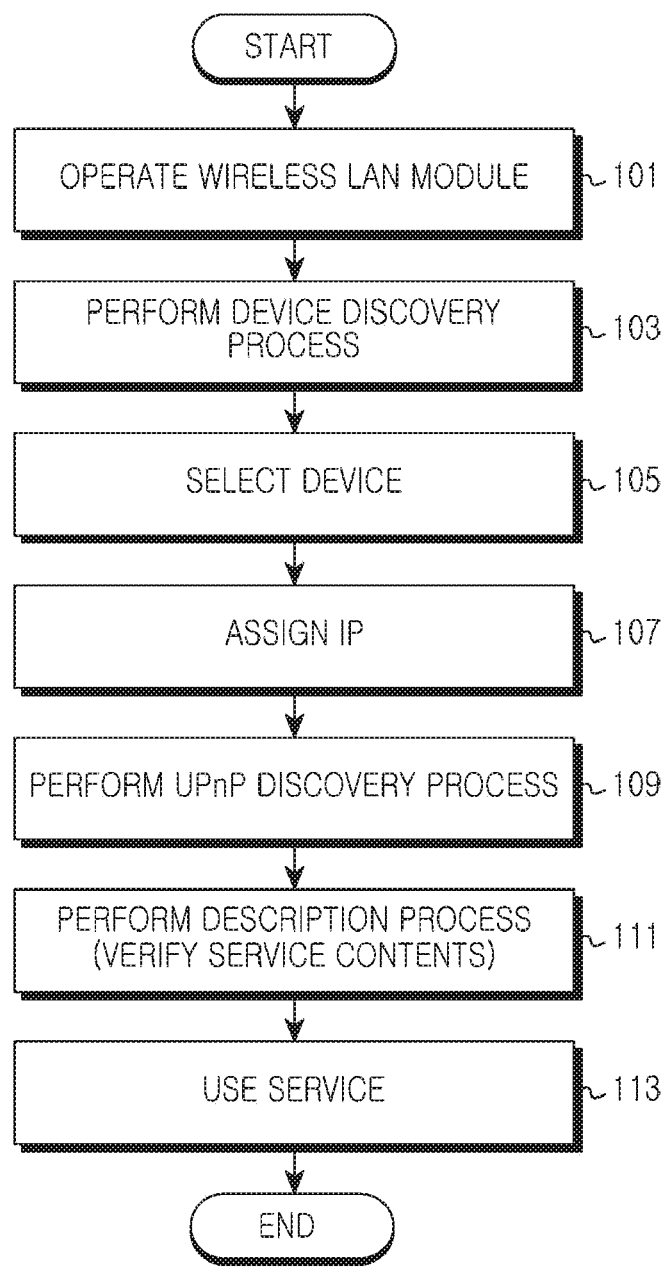
FIG. 1 is a flowchart illustrating a process of performing a Wi-Fi direct function in a general portable terminal.
Figure 2:
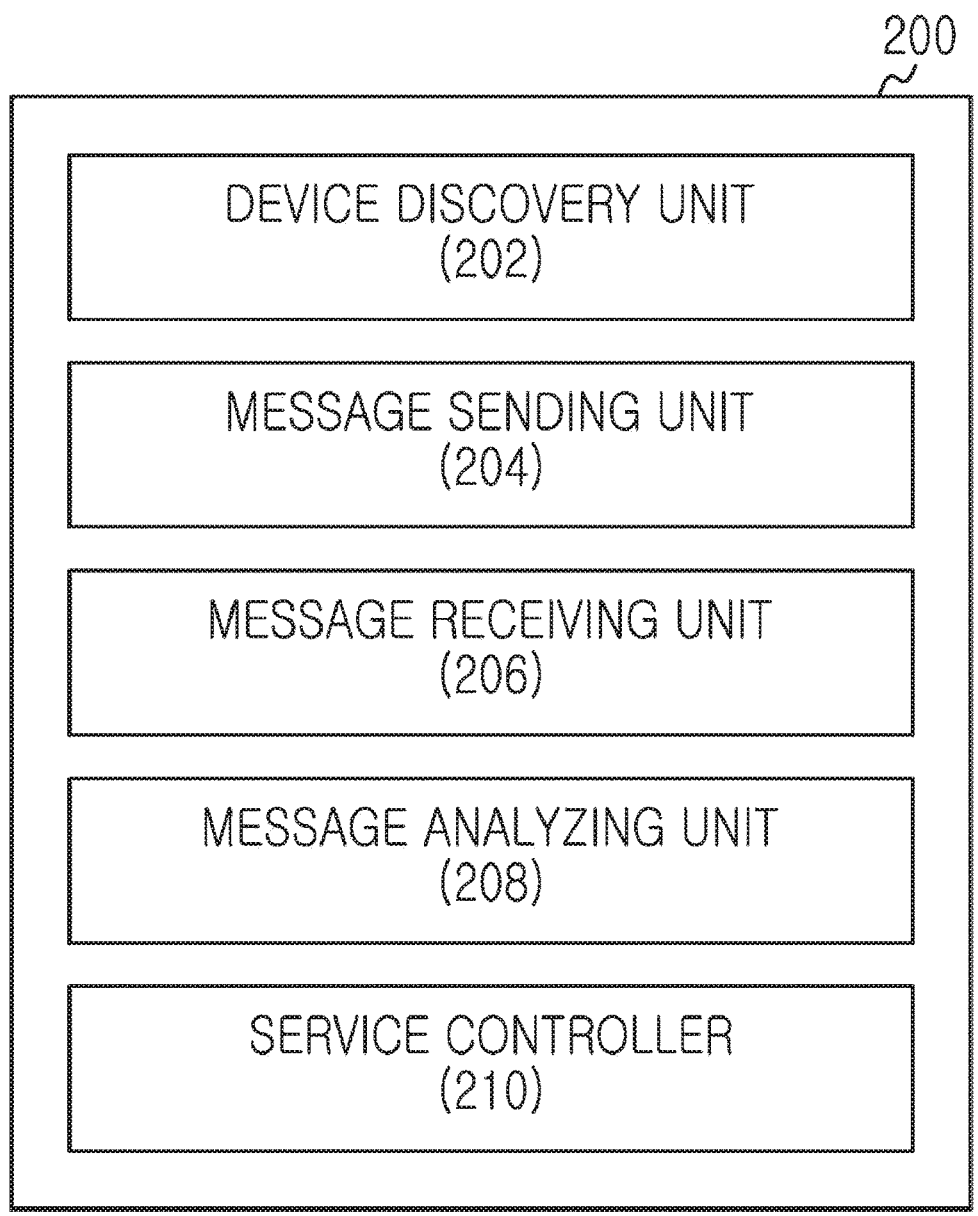
FIG. 2 is a block diagram illustrating a structure of a P2P group owner according to the present invention.

FIG. 2 is a block diagram illustrating a structure of a P2P group owner according to the present invention.

Referring to FIG. 2, the P2P group owner denoted by 200 means a terminal for controlling a P2P client using a UPnP service function based on Wi-Fi direct connection. The P2P group owner may include a device discovery unit 202, a message sending unit 204, a message receiving unit 206, a message analyzing unit 208, and a service controller 210.

First of all, the device discovery unit 202 performs an operation for discovering terminals which exists around the P2P group owner through a wireless LAN module. That is, the device discovery unit 202 performs a device discovery process of a Wi-Fi MAC layer. The device discovery unit 202 transmits a discovery request signal, discovers P2P clients which exist around the P2P group owner, and writes a list of the P2P clients using response signals received from the P2P clients.

The message sending unit 204 sends the discovery request signal to the P2P clients which exist around the P2P group owner under control of the device discovery unit 202. The message receiving unit 206 receives a response signal for the discovery request signal under control of the device discovery unit 202. Herein, the response signal received through the message receiving unit 206 includes URI information capable of controlling a P2P client. The message sending unit 204 and the message receiving unit 206 may include a wireless LAN module for performing a Wi-Fi direct function, respectively.

The message analyzing unit 208 analyzes the response message received through the message receiving unit 206 and acquires URI information corresponding to the P2P client. The service controller 210 controls the P2P client using the acquired URI information. That is, a conventional P2P group owner receives URI information of a P2P client through a UPnP discovery process which is a device discovery process of a conventional application layer. However, the service controller 210 according to the present invention verifies service information provided from a P2P client using URI information acquired through a device discovery process of a Wi-Fi MAC layer and may perform a control operation to use a service of the P2P client. That is, a P2P group owner according to the present invention may improve performance of a UpnP service based on Wi-Fi direct connection by reducing a conventional device discovery process which is repeated.

The functions of elements included in the P2P group owner 200, that is the device discovery unit 202, the message sending unit 204, the message receiving unit 206, the message analyzing unit 208, and the service controller 210, may be performed by a controller of the P2P group owner 200. However, the present invention includes the controller, the device discovery unit 202, the message sending unit 204, the message receiving unit 206, the message analyzing unit 208, and the service controller 210 which are exemplary configurations for the convenience of explanation and are not limited to a scope of the prevent invention. It will be understood by those skilled in the art that various changes in form and details may be made therein without departing from the spirit and scope of the present invention. For example, all of them may be composed to be processed in the controller.

Figure 3:
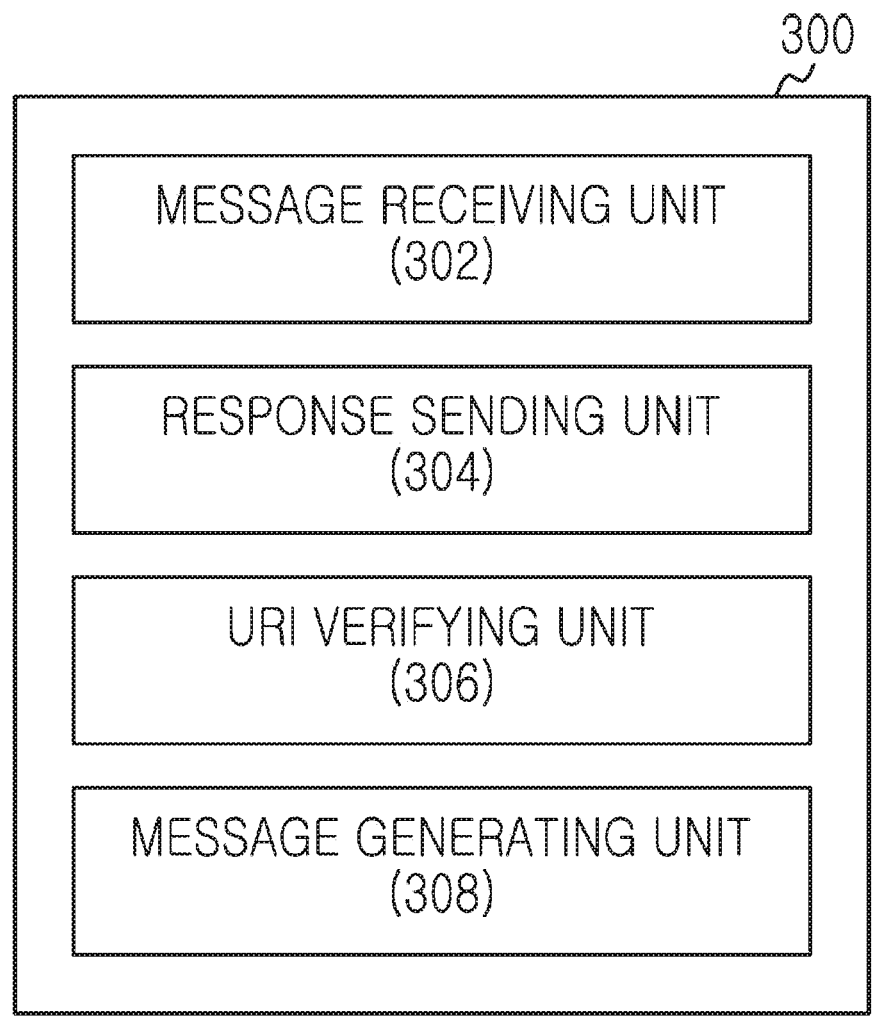
FIG. 3 is a block diagram illustrating a structure of a P2P client according to the present invention.

FIG. 3 is a block diagram illustrating a structure of a P2P client according to the present invention.

Referring to FIG. 3, the P2P client denoted by 300 means a terminal for being controlled by a P2P group owner using a UPnP service function based on Wi-Fi direct connection. The P2P client 300 may include a message receiving unit 302, a response sending unit 304, a URI verifying unit 306, and a message generating unit 308.

First of all, the message receiving unit 302 receives a discovery request signal from a P2P group owner which performs a device discovery process of a Wi-Fi MAC layer. The response sending unit 304 sends a response signal for the received discovery request signal to the P2P group owner. That is, the response sending unit 304 sends the response signal including port information, URI information, and IP address information, which may control the P2P client 300, to the P2P group owner.

The URI verifying unit 306 verifies the URI information capable of controlling a service of the P2P client 300. The message generating unit 308 generates a response signal including the URI information verified by the URI verifying unit 306.

The functions of elements included in the P2P client 300, that is the message receiving unit 302, the response sending unit 304, the URI verifying unit 306, and the message generating unit 308, may be performed by a controller of the P2P client 300. However, the present invention includes the controller, the message receiving unit 302, the response sending unit 304, the URI verifying unit 306, and the message generating unit 308 which are exemplary configurations for the convenience of explanation and are not limited to a scope of the prevent invention. It will be understood by those skilled in the art that various changes in form and details may be made therein without departing from the spirit and scope of the present invention. For example, all of them may be composed to be processed in the controller.

Figure 4:
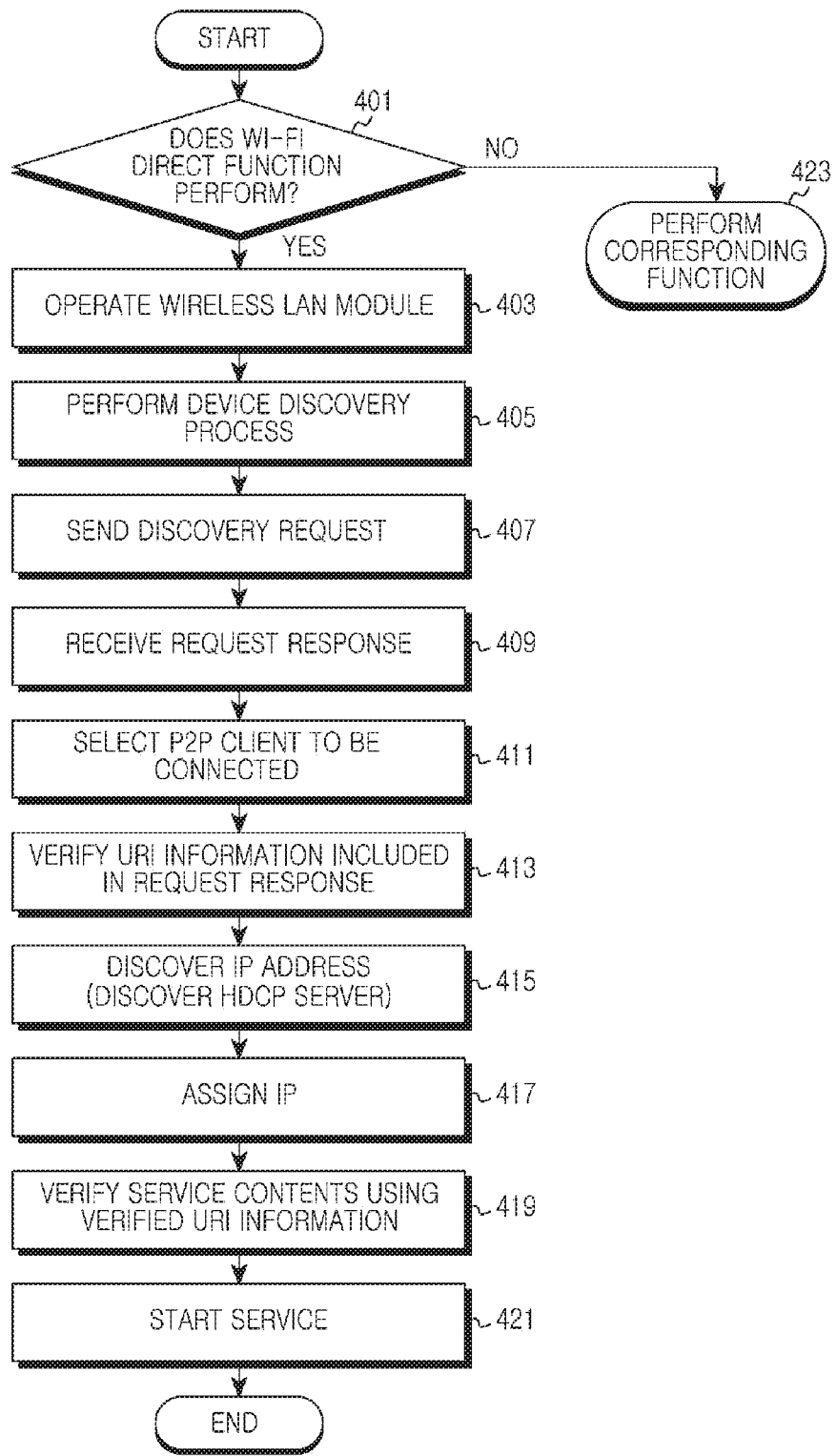
FIG. 4 is a flowchart illustrating a process of providing a UPnP service function based on Wi-Fi direct connection in a portable terminal according to the present invention.

FIG. 4 is a flowchart illustrating a process of providing a UPnP service function based on Wi-Fi direct connection in a portable terminal according to the present invention.

Referring to FIG. 4, the portable terminal is a P2P group owner which controls a P2P client using a UPnP service function based on Wi-Fi direct connection.

First of all, the portable terminal verifies whether to perform a Wi-Fi direct function in step 401. Herein, the Wi-Fi direct function means technology capable of freely performing communication between Wi-Fi terminals without an AP or a router. Also, the Wi-Fi direct function is a function capable of sharing a printer, contents, etc. through communication between terminals in which Wi-Fi is supported.

If the Wi-Fi direct function is not performed in step 401, the portable terminal proceeds to step 423 and performs a corresponding function (e.g., a waiting mode).

On the other hand, if the Wi-Fi function is performed in step 401, the portable terminal proceeds to step 403 and operates a wireless LAN module for Wi-Fi connection. The portable terminal proceeds to step 405 and performs a device discovery process for discovering terminals (terminals to be connected for performing the Wi-Fi direct function) which exist around the portable terminal. Herein, the device discovery process is a device discovery process of a Wi-Fi MAC layer.

The portable terminal for performing the device discovery process proceeds to step 407 and sends a discovery request to peripheral terminals (P2P clients). The portable terminal proceeds to step 409 and receives request responses transmitted from the peripheral terminals which receive the discovery request. As described above, the request responses are response messages transmitted from the peripheral terminals which receive the discovery request. Each of the request responses includes URI information capable of acquiring device information and service information according to the present invention. Herein, the portable terminal verifies URI information of a P2P client through the device discovery process of the Wi-Fi MAC layer to omit a device discovery process of an application layer, which verifies whether a newly registered device exists and URI information for accessing the newly registered device.

The portable terminal writes a list for the terminals which send the request responses. The portable terminal proceeds to step 411 and receives information about a P2P client to be connected, which is selected by a user.

The portable terminal proceeds to step 413 and verifies the URI information included in the request response received from a peripheral terminal corresponding to the P2P client. The portable terminal proceeds to step 415, discovers a Dynamic Host Configuration Protocol (DHCH) server, and verifies an IP address.

The portable terminal proceeds to step 417 and assigns an IP to communicate with the P2P client using the verified IP address.

The portable terminal proceeds to step 419 and verifies service contents of the P2P client using the URI information verified in step 413. The portable terminal proceeds to step 421 and performs a UPnP service function based on Wi-Fi direct connection.

The aforementioned portable terminal according to the present invention verifies the URI information for controlling the P2P client without performing the UPnP discovery process which is the device discovery process of the application layer and may solve a problem in which time up to a service provision ready state according to the UPnP discovery process is delayed.

Thereafter, the portable terminal ends the algorithm of FIG. 4.

Figure 5:
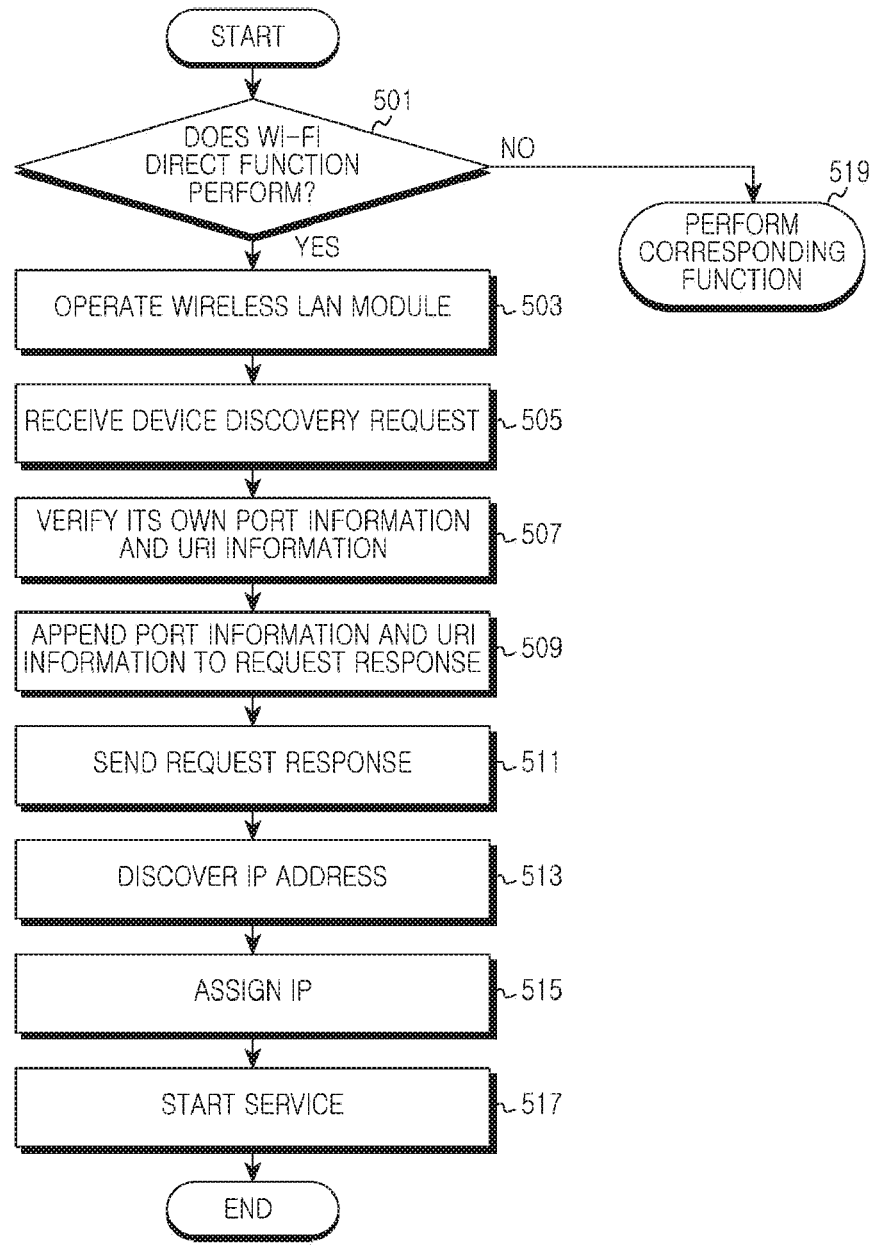
FIG. 5 is a flowchart illustrating a process of being controlled using a UPnP service function based on Wi-Fi direction connection in a portable terminal according to one embodiment of the present invention.

FIG. 5 is a flowchart illustrating a process of being controlled using a UPnP service function based on Wi-Fi direct connection in a portable terminal according to one embodiment of the present invention.

Referring to FIG. 5, the portable terminal is a P2P client controlled by a P2P group owner using a UPnP service function based on Wi-Fi direct connection. The portable terminal may be a DHCP client which receives an IP address after IP connection.

First of all, the portable terminal verifies whether to perform a Wi-Fi direct function in step 501. Herein, as described above, the Wi-Fi direct function is a function capable of sharing a printer, contents, etc. through communication between terminals in which Wi-Fi is supported.

If the Wi-Fi direct function is not performed in step 501, the portable terminal proceeds to step 519 and performs a corresponding function (e.g., a waiting mode).

On the other hand, if the Wi-Fi direct function is performed, the portable terminal proceeds to step 503 and operates a wireless LAN module for Wi-Fi connection. The portable terminal proceeds to step 505 and receives a device discovery request from a terminal (a terminal for attempting to perform a Wi-Fi direct function) which exists around it. Herein, the device discovery request is a device discovery request of a Wi-Fi MAC layer.

The portable terminal proceeds to step 507 and verifies its own port information and URI information. The portable terminal proceeds to step 509 and appends the verified information to a response for the request received in step 505. Herein, the portable terminal provides URI information for control to a P2P group owner without performing a UPnP discovery process which is a device discovery process of an application layer.

The portable terminal proceeds to step 511 and sends the request response including the port information and the URI information to the P2P group owner. The portable terminal proceeds to step 513, discovers a DHCP server, and verifies an IP address.

The portable terminal proceeds to step 515 and assigns an IP to communicate with the P2P group owner using the verified IP address.

The portable terminal proceeds to step 517 and performs a UPnP service function based on Wi-Fi direct connection under control of the P2P group owner.

Thereafter, the portable terminal ends the algorithm of FIG. 5.

Figure 6:
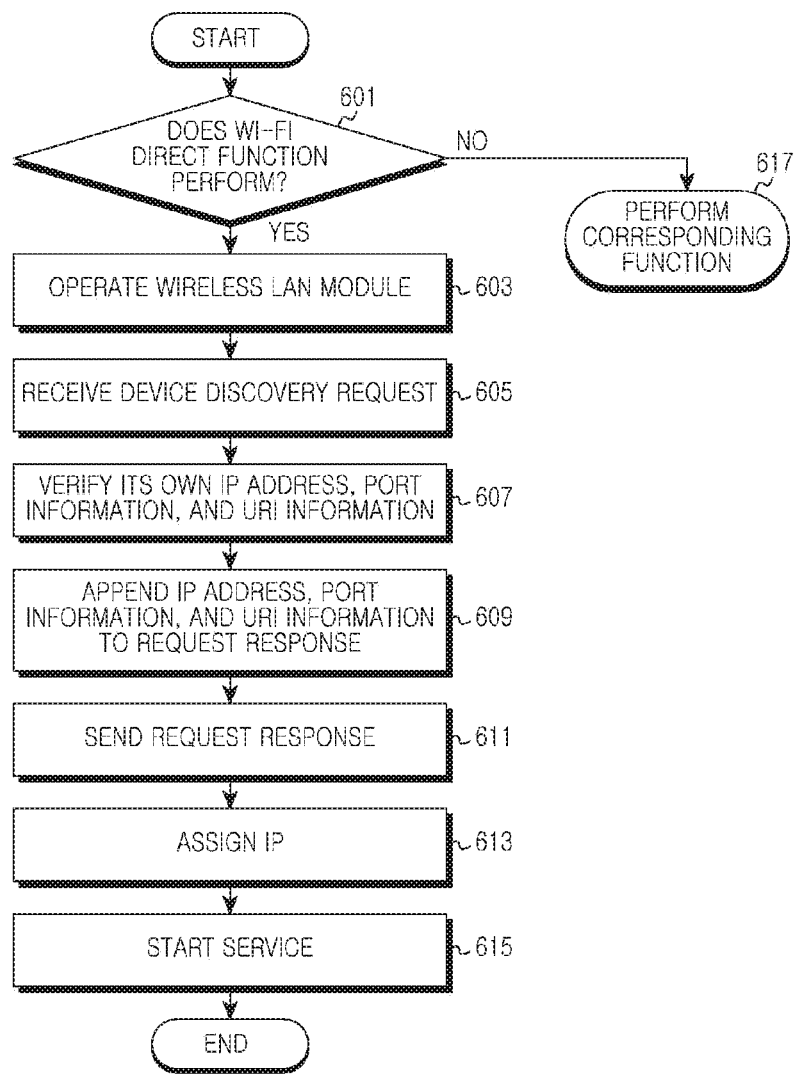
FIG. 6 is a flowchart illustrating a process of being controlled using a UPnP service function based on Wi-Fi direction connection in a portable terminal according to another embodiment of the present invention.

FIG. 6 is a flowchart illustrating a process of being controlled using a UPnP service function based on Wi-Fi direct connection in a portable terminal according to another embodiment of the present invention.

Referring to FIG. 6, the portable terminal is a P2P client controlled by a P2P group owner using the UPnP service function based on the Wi-Fi direct connection. The portable terminal may be a DHCP server capable of assigning an IP address before IP connection.

First of all, the portable terminal verifies whether to perform a Wi-Fi direct function in step 601. Herein, as described above, the Wi-Fi direct function is a function capable of sharing a printer, contents, etc. through communication between terminals in which Wi-Fi is supported.

If the Wi-Fi direct function is not performed in step 601, the portable terminal proceeds to step 617 and performs a corresponding function (e.g., a waiting mode).

On the other hand, if the Wi-Fi direct function is performed in step 601, the portable terminal proceeds to step 603 and operates a wireless LAN module for Wi-Fi connection. The portable terminal proceeds to step 605 and receives a device discovery request from a terminal (a terminal for attempting to perform a Wi-Fi direct function) which exist around it. Herein, the device discovery request is a device discovery request of a Wi-Fi MAC layer.

The portable terminal proceeds to step 607 and verifies its own IP address, port information, and URI information. The portable terminal proceeds to step 609 and appends the verified information to a response for the request received in step 605. Herein, the portable terminal provides URI information for control to a P2P group owner without performing a UPnP discovery process which is a device discovery process of an application layer.

The portable terminal proceeds to step 611 and sends the request response including the IP address, the port information, and the URI information to the P2P group owner. The portable terminal proceeds to step 613 and assigns an IP to communicate with the P2P group owner using the IP address.

The portable terminal proceeds to step 615 and performs a UPnP service function based on Wi-Fi direct connection under control of the P2P group owner.

Thereafter, the portable terminal ends the algorithm of FIG. 6.

FIGS. 7A, 7B, and 7C illustrate structures of a device discovery request response message including URI information of a P2P client according to one embodiment of the present invention.

FIG. 7A illustrates a structure of a device discovery request response message including specific port information of a P2P client according to one embodiment of the present invention.

Referring to FIG. 7A, the P2P client corresponds to a DHCP client which receives an IP address after IP connection.

As the P2P client may not verify an IP address when transmitting a device discovery request response of a Wi-Fi MAC layer, it includes only its own specific port information and URI information in the request response message. That is, as shown in FIG. 7A, the portable terminal includes a specific port number (8080) and URI information (smp/device.xml), that is information (8080/smp/device.xml) (701), in a conventional response message. A P2P group owner which receives the response message may verify URI information (http://xxx.xxx.xxx:8080/smp/device/xml) using specific port information corresponding to 8080.

FIG. 7B illustrates a structure of a device discovery request response message including specific port information of a P2P client according to one embodiment of the present invention.

Referring to FIG. 7B, the P2P client corresponds to a DHCP client which receives an IP address after IP connection.

As the P2P client may not verify an IP address when transmitting a device discovery request response of a Wi-Fi MAC layer, it includes only its own specific port information and URI information in the request response message. Herein, when the P2P client uses not a specific port but a defaulted port number (port number 80), it includes only URI information (smp/device.xml) (703) in the request response message. That is, as shown in FIG. 7B, the P2P client includes only the URI information (smp/device.xml) in a conventional response message. A P2P group owner which receives the response message may verify URI information (http://xxx.xxx.xxx:80/smp/device.xml) using default port information.

FIG. 7C illustrates a structure of a device discovery request response message including an IP address of a P2P client according to one embodiment of the present invention.

Referring to FIG. 7C, the P2P client corresponds to a DHCP server capable of assigning an IP address before IP connection.

As the P2P client may verify an IP address when transmitting a device discovery request message of a Wi-Fi MAC layer, it includes its own IP address, specific port information, and URI information in the request response message. That is, as shown in FIG. 7C, the P2P client includes the IP address (http://192.168.0.10), the specific port number (8080), and the URI information (smp/device.xml), that is URI information (http://192.168.0.10:8080/smp/device.xml) (705), in a conventional response message. A P2P group owner which receives the response message may verify the URI information (http://192.168.0.10:8080/smp/device.xml) (705) using specific port information corresponding to 8080.

The P2P group owner may verify URI information capable of controlling the P2P client through the device discovery process of the Wi-Fi MAY layer without performing the UPnP discovery process which is the device discovery process of the application layer according to one embodiment of the present invention.

As described above, the present invention may improve performance of a UPnP service based on Wi-Fi direct connection by generating a response signal including URI information in a P2P client which receives the service discovery request according to the device discovery process of the Wi-Fi MAC layer and omitting the UPnP discovery process which is the device discovery process of the application layer.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An apparatus comprising:
a communication module configured to perform a peer-to-peer (P2P) connection; and
a hardware processor configured to:
control the communication module to broadcast a device discovery request for performing a P2P device discovery process via a medium access control (MAC) layer,
control the communication module to receive, from an external apparatus responding to the device discovery request, without using a network node, a response message during the P2P device discovery process without performing a device discovery process of an application layer, the response message including a uniform resource identifier (URI), the URI identifying device information of the external apparatus and information on a designated service which the external apparatus provides, the designated service used for controlling the external apparatus by the apparatus,
verify the URI included in the response message via the P2P device discovery process via the MAC layer,
verify the designated service based on the verified URI, and
based on the device information and the information on the designated service, perform the P2P connection with the external apparatus and an operation associated with the designated service,
wherein the information on the designated service is identified using the URI associated with a universal plug and play (UPnP) function which the external apparatus is capable of performing.

2. The apparatus of claim 1, wherein the designated service includes a universal plug and play (UPnP) service.

3. The apparatus of claim 1, wherein the P2P connection includes a Wi-Fi direct connection.

4. An apparatus comprising:
a communication module configured to perform a peer-to-peer (P2P) connection; and
a hardware processor configured to:
control the communication module to receive a device discovery request for performing a P2P device discovery process via a medium access control (MAC) layer from an external apparatus,
identify device information of the apparatus and information on a designated service which the apparatus provides, the designated service used for controlling the apparatus by the external apparatus,
verify a uniform resource identifier (URI), the URI identifying the device information and the information on the designated service, and
control the communication module to transmit, to the external apparatus, without using a network node, a response message during the P2P device discovery process without performing a device discovery process of an application layer, the response message including the URI,
wherein the information on the designated service is identified using the URI associated with a universal plug and play (UPnP) function which the external apparatus is capable of performing.

5. The apparatus of claim 4, wherein the designated service includes a universal plug and play (UPnP) service.

6. The apparatus of claim 4, wherein the P2P connection includes a Wi-Fi direct connection.

7. A method comprising:
broadcasting, by a communication module of an apparatus, a device discovery request for performing a peer-to-peer (P2P) device discovery process via a medium access control (MAC) layer;
receiving, by the communication module, from an external apparatus responding to the device discovery request, without using a network node, a response message during the P2P device discovery process without performing a device discovery process of an application layer, the response message including a uniform resource identifier (URI), the URI identifying device information of the external apparatus and information on a designated service which the external apparatus provides, the designated service used for controlling the external apparatus by the apparatus;
verifying the URI included in the response message via the P2P device discovery process via the MAC layer;
verifying the designated service based on the verified URI; and
based on the device information and the information on the designated service, performing a P2P connection with the external apparatus and an operation associated with the designated service,
wherein the information on the designated service is identified using the URI associated with a universal plug and play (UPnP) function which the external apparatus is capable of performing.

8. The method of claim 7, wherein the designated service includes a universal plug and play (UPnP) service.

9. The method of claim 7, wherein the P2P connection includes a Wi-Fi direct connection.

10. A method comprising:
receiving, by a communication module of an apparatus, a device discovery request for performing a peer-to-peer (P2P) device discovery process via a medium access control (MAC) layer from an external apparatus;
identifying device information of the apparatus and information on a designated service which the apparatus provides, the designated service used for controlling the apparatus by the external apparatus;
verifying a uniform resource identifier (URI), the URI identifying the device information and the information on the designated service; and
transmitting, to the external apparatus, without using a network node, a response message during the P2P device discovery process without performing a device discovery process of an application layer, the response message including the URI,
wherein the information on the designated service is identified using the URI associated with a universal plug and play (UPnP) function which the external apparatus is capable of performing.

11. The method of claim 10, wherein the designated service includes a universal plug and play (UPnP) service.

12. The method of claim 10,
wherein the communication module is configured to perform a P2P connection, and
wherein the P2P connection includes a Wi-Fi direct connection.

\* \* \* \* \*